United States Patent

Schonlau et al.

[11] Patent Number: 5,354,122
[45] Date of Patent: Oct. 11, 1994

[54] SEATING FOR AN INERTIA BALL OF A DECELERATION-SENSITIVE BRAKE POWER CONTROL

[75] Inventors: Juergen Schonlau, Walluf; Holger von Hayn, Bad Vilbel, both of Fed. Rep. of Germany

[73] Assignee: Alfred Teves GmbH, Frankfurt am Main, Fed. Rep. of Germany

[21] Appl. No.: 857,938

[22] PCT Filed: Sep. 6, 1991

[86] PCT No.: PCT/EP91/01694

§ 371 Date: May 18, 1992

§ 102(e) Date: May 18, 1992

[87] PCT Pub. No.: WO92/05055

PCT Pub. Date: Apr. 2, 1992

[30] Foreign Application Priority Data

Sep. 19, 1990 [DE] Fed. Rep. of Germany ....... 4029597
Aug. 16, 1991 [DE] Fed. Rep. of Germany ....... 4127044

[51] Int. Cl.⁵ .......................... B60T 8/28; B60T 8/32
[52] U.S. Cl. .................... 303/9.68; 188/349; 303/24.1
[58] Field of Search ............... 303/24.1, 9.67, 9.68; 188/349

[56] References Cited

U.S. PATENT DOCUMENTS

| | | | |
|---|---|---|---|
| 3,476,443 | 11/1969 | Bratten et al. | 303/9.68 |
| 4,718,734 | 1/1988 | Gaiser | 303/24.1 |
| 4,736,989 | 4/1988 | Myers et al. | 303/24.1 X |
| 4,840,433 | 6/1989 | Schonlau et al. | 303/24.1 X |
| 5,022,715 | 6/1991 | Schonlau | 303/24.1 X |
| 5,195,806 | 3/1993 | Schonlau et al. | 303/24.1 X |

FOREIGN PATENT DOCUMENTS

| | | |
|---|---|---|
| 0165858 | 12/1985 | European Pat. Off. |
| 2801044 | 7/1979 | Fed. Rep. of Germany. |
| 3709991 | 10/1988 | Fed. Rep. of Germany. |
| 4010546 | 10/1991 | Fed. Rep. of Germany. |
| 2168442 | 6/1986 | United Kingdom ............... 303/9.67 |

Primary Examiner—Douglas C. Butler
Attorney, Agent, or Firm—Robert P. Seitter; J. Gordon Lewis

[57] ABSTRACT

A seating for an inertia ball (101) of a deceleration-sensitive brake power control is disclosed, featuring a substantially stepped feature (114) located above a bottom area (105) and which feature engages the inertia ball so as to not allow any horizontal free movement of the inertia ball (101). Advantageously, a positive restraint is provided engaging the inertia ball (101) in a backward direction with respect to the driving direction (v). The chamber (120) beneath the inertia ball (101) collects pressure fluid, so that the inertia ball (101) remains dry.

10 Claims, 3 Drawing Sheets

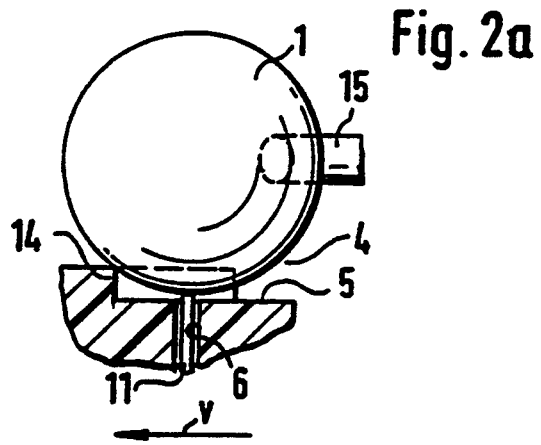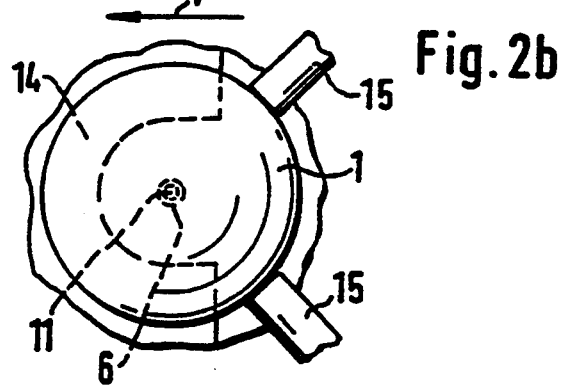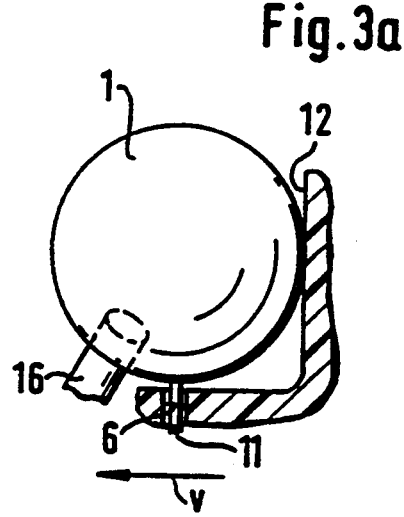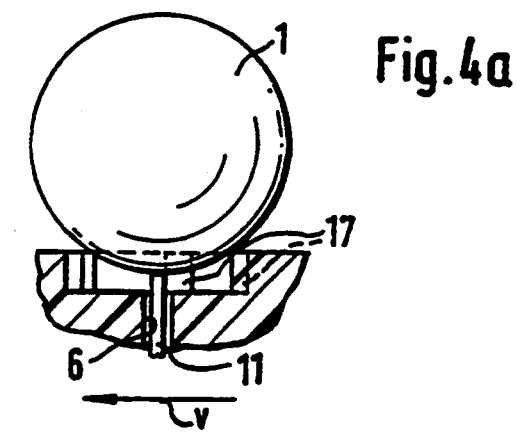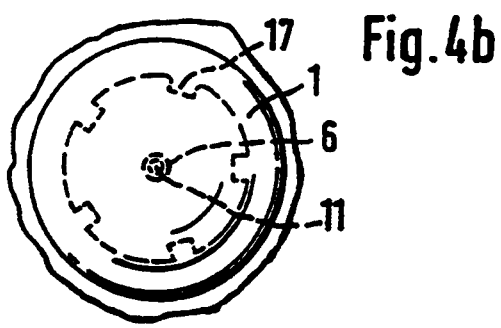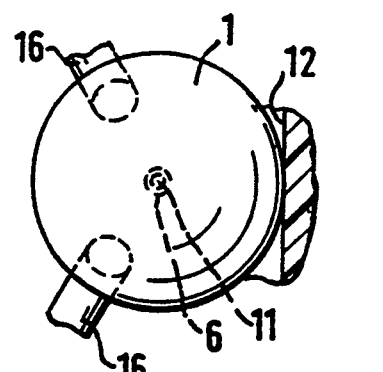

5,354,122

SEATING FOR AN INERTIA BALL OF A DECELERATION-SENSITIVE BRAKE POWER CONTROL

BACKGROUND OF THE INVENTION

The invention is related to a seating for an inertia ball used in a deceleration sensitive brake control power.

A seating of this kind shown in German patent application published without examination, No. 3,709,991. There, the inertia ball lies in a funnel-shaped depression with different angles of inclination, which depression is formed by ribs which are directed radially inwardly toward a control valve. Due to the different angles of inclination, the inertia ball is given an oval seating and, consequently, a certain amount of horizontal play. The ball when centered on the ribs keeps a spring loaded control valve open, but is caused to roll out of the funnel upon being subjected to a predetermined rate of deceleration, permitting the valve to close. It has, however, been discovered that due to vibrations of the vehicle, the ball may start to dance or to turn round and, as a result, can be caused to roll out at various different rates of decelerations.

It is the object of the present invention to create a suitable seating for an inertia ball which ensures a virtually perfectly stable position of the inertia ball until a predetermined deceleration rate is reached and which eliminates any response to lower rates of deceleration.

SUMMARY OF THE INVENTION

This object is achieved by a stepped shaped edge employed to engage a limited portion of the perimeter of the ball, with the stepped edge engagement not allowing any movement of the ball in a horizontal direction below a predetermined rate of deceleration of the vehicle. Variations in the deceleration rates causing movement of the inertia ball out of the seat are thus avoided.

According to another feature of the invention, the inertia ball is positively restrained in a direction opposite the direction of motion in order to achieve a greater stability. This feature will scarcely impair the functioning of the brake power control, since in this configuration the inertia ball is only prevented from leaving the seating by an acceleration of the vehicle. When this positive restraint is realized by a rear wall which defines the first chamber, the mounting of any additional elements will not be required. If, however, pins are additionally introduced into the first chamber from the outside horizontally from the rear, then, advantageously, a precision adjustment may be carried out subsequently.

Either a pitch circle-shaped supporting socket which extends in circumferential direction or individual points of support are of advantage.

The invention may take the form of various embodiments. In the following, some examples of these will be described in more detail, making reference to accompanying drawings.

DESCRIPTION OF THE DRAWINGS

FIG. 2a is a fragmentary, cross sectional view of a second embodiment of the seating according to the invention;

FIG. 2b is a fragmentary top view of the embodiment shown in FIG. 2a;

FIG. 3a is a fragmentary cross sectional view, of a third embodiment;

FIG. 3b is a fragmentary top view of the third embodiment;

FIG. 4a is a fragmentary, cross sectional view, of a fourth embodiment;

FIG. 4b is a fragmentary top view of the fourth embodiment;

FIG. 5b is a top view of the seating embodiment shown in FIG. 5a.

DETAILED DESCRIPTION

Figure 1A:
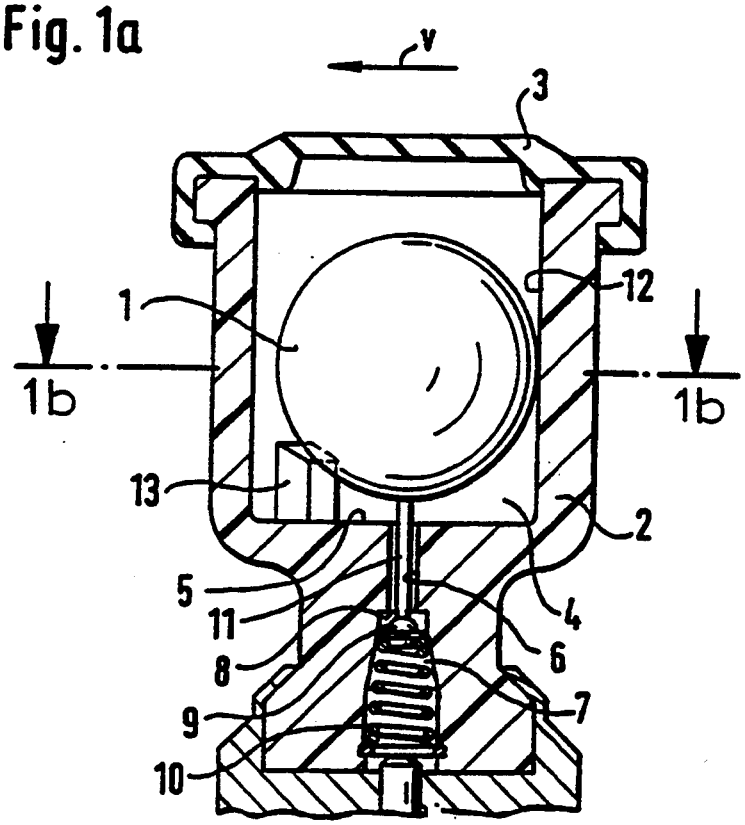
FIG. 1a is a partial cross sectional view showing details of a brake power control with a seating of the inertia ball according to the present invention.
Figure 1B:
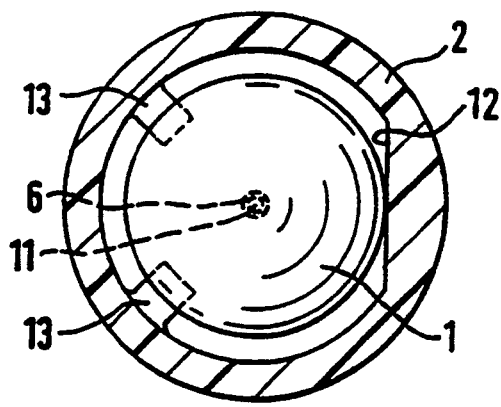
FIG. 1b is a partial cross sectional view taken through FIG. 1a along the line 1b—1b.

In FIG. 1a and in FIG. 1b the position of the inertia ball 1 within a first chamber 4 is visible. The chamber 4 is formed by a housing 2 and by a closing cap 3. The bottom area 5 which is almost completely flat is furnished with a vertically directed hole 6 which connects the first chamber 4 to a second chamber 7. The mouth of the hole 6 into the second chamber 7 defines a valve seat 8 for a substantially spherical valve closing member 9 which is subjected to the action of a compression spring 10 in the direction of the valve seat 8. The valve closing member 9 is rigidly coupled to a valve actuating pin 11 which projects through the hole 6 from the second chamber 7 into the first chamber 4. The rear wall 12 of the first chamber 4 which is defined by the intended driving direction "v" positively restrains the inertia ball 1 any movement in the opposite direction from the driving direction, at the level of its center.

At the front side of the inertia ball 1 further supports are formed by two circumferentially spaced step protrusions comprising two separate posts 13 which have a stepped edge which engage a limited portion of the perimeter of the inertia ball 1 without any horizontal clearance space to keep the inertia ball 1 in a stable position of rest at such a level that it does not come in contact with the bottom area 5, but does keeps the valve closing member 9 spaced from the valve seat 8 by the weight of the inertial ball acting on the valve actuating pin 11. The pair of protrusions 13 are spaced apart in a horizontal plane on either side of a vertical plane aligned with the direction of movement v and passing through the center of the inertia ball 1, and engage the forward side of the ball 1. The rear wall 12 comprises a fixed surface engaging the opposite side of the ball 1 at a point aligned with center of the ball 1. The two protrusions 13 and the rear wall provide three points of contact with the ball 1. The posts 13 restrain the ball from movement in the direction "v⇌ due to braking deceleration until a predetermined rate is reached.

In the embodiment according to FIGS. 2a and 2b the support of the inertia ball 1 in the driving direction "v" is realized by a single U-shaped step 14 which has a pitch circle-shaped stepped edge engaging a limited portion of a with the ball perimeter. In the backward direction, the inertia ball 1 is positively restrained by two pins 15 which are formed with flattened front sides which are introduced into the chamber 4 pointing horizontally toward the center of the inertia ball 1 and the position of which are adjusted in accordance with the desired position of the inertia ball 1. The contact with the two pins 15 and step 14 also provide three contact areas with the ball 1.

In FIG. 3a and in FIG. 3b the step protrusions take the form of pins 16 comprising a seating of the inertia ball 1 in the driving direction "v". Coming obliquely from below, they point toward the center of the inertia ball 1. In this instance, the rear wall 12 serves as a positive restraint against movement in the backward direction, as in the embodiment of FIG. 1.

In the embodiment according to FIG. 4a and FIG. 4b, the driving direction is not distinctly marked out with respect to other directions. At least three, that is to say, five identical step protrusions 17 in this example, are arranged circumferentially spaced symmetrically in a circle around the hole 6, so that it will be possible in this instance to mount the control in five different directions at an angle of 72 degrees each relative to one another, with each protrusion 17 aligned with the direction "v" on the rearward edge as shown in FIG. 4b.

Figure 5A:
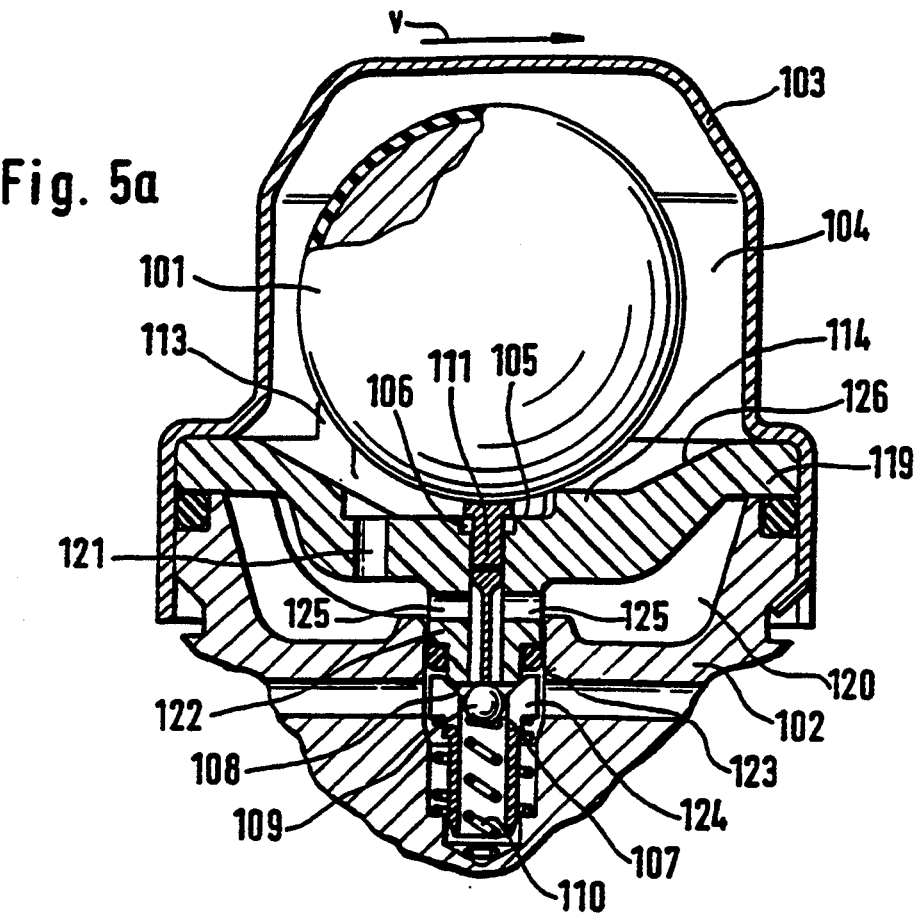
FIG. 5a is a fragmentary, partially sectional view of another brake power control showing yet another embodiment of the seating according to the present invention.
Figure 5B:
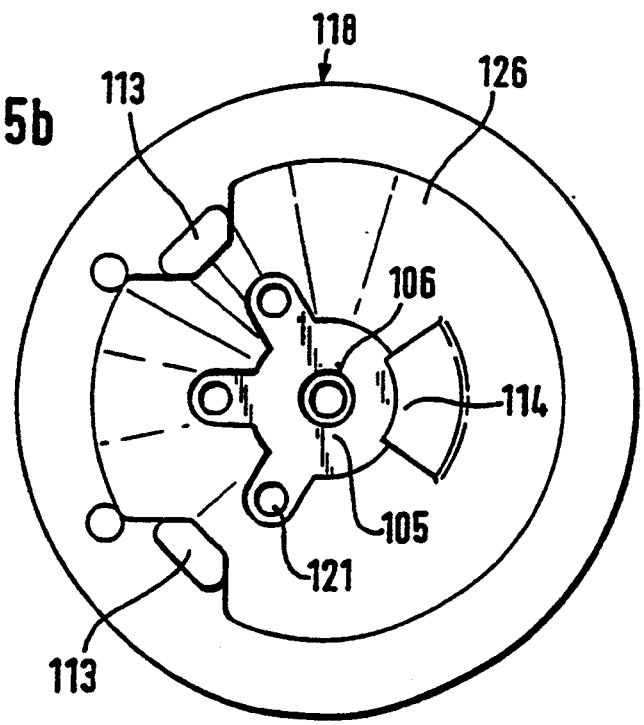

On account of the great differences with the arrangements so far described, other reference numerals will be used in FIG. 5. For those components whose function corresponds to that of components of the previous drawings the numerals, however, are merely increased by 100 over the corresponding numerals used in the other Figures.

In FIG. 5 a further chamber 120 is formed by the insert 119 between the first chamber 104 and the second chamber 105. In chamber 104 the inertia ball 101 is accommodated, while chamber 120 serves to collect ascending pressure fluid. At most, the inertia ball 101 comes in contact with pressure fluid in the event of major shocks. For such cases the bottom area 105 of said insert 119 is furnished with a plurality of holes 121 which connect the two chambers 104, 120 to each other. While the chamber 120 is formed by a recess in the housing 102, the upper chamber 104 is surrounded by the closing cap 103 which has a top-shaped configuration and which is pressure-tightly fixed to the housing 102 and clamps the insert 119. When the upper chamber 104 is being fabricated this arrangement will save a broaching cut from a housing block.

The valve seat 108 is positioned at the extension 122 of the insert 119. The extension 122 is sealed and projects downwardly into the axial bore 123 of the housing 102 and is provided with radial holes 125 leading from the hole 106 to the chamber 120. The central hole 106 extends axially all way through the insert 119 and guides the valve actuating pin 111. The latter keeps the valve closing member 109 at a distance from the valve seat 108. At the blind end of the axial bore 123 the compression spring 110 acts upon the valve closing member 109 in the closing direction. The valve closing member 109 is axially guided in the guide bushing 124. The guide bushing 124 is formed with radial passages (not shown in the drawing) which link the chamber 107 to the radial ducts 125 which lead to one or to a plurality of brake pressure control valves.

The seating of the inertia ball 101 is composed of the pitch circle-shaped step 114 and of the posts 113. The step 114 is disposed in the driving direction "v" as seen from the hole 106 and is nearer to the hole 106 than the two posts 113 which are disposed specularly symmetrical with respect to the driving direction "v" behind the hole 106 and which have an edge engaging the inertia ball 1 to support the inertia ball 101 in the backward direction.

In accordance with their distance from the hole 106, the height of the posts 113 is sized such that in the position of rest, that is to say, in the stable equilibrium condition, the center of the inertia ball 101 is situated directly above the valve actuating pin 111. The step 114 as well as the post 113 are molded to the truncated cone-shaped, obtuse-angled depression 126 whose bottom forms the bottom area 105. In order to make sure that the step 114 and post 113 are not damaged by the inertial ball 101 in the event of major shocks, the latter is coated with an elastomeric, pressure fluid-resistant material. Any adhesion of the inertial ball 101 to its seating that may be promoted by this soft coating and that may be due to a wetting with pressure fluid will effectively be excluded due to the small contact surfaces and due to the fast draining of the pressure fluid through the holes 121.

We claim:

1. A seating for an inertia ball of a brake power control for an automotive vehicle sensitive to deceleration along a forward direction of movement of said vehicle, said brake power control including a housing having a first chamber and a second chamber positioned beneath said first chamber, said inertia ball located in said first chamber, a bottom area forming a bottom of said first chamber, a hole being formed in said bottom area which provides a fluid connection of said first chamber to said second chamber, a valve actuating pin extending through said hole in said second chamber into said first chamber, a valve controlled by the position of said valve actuating pin in said hole, said valve actuating pin position controlled by said inertia ball, said valve able to close said fluid connection from said first chamber to said second chamber, and inertia ball seating means engaging the surface of said inertia ball, said inertia ball seating means including a plurality of stepped protrusions spaced apart inn a horizontal plane and raised above said bottom area, said inertia ball held on said pair of protrusions with only the weight thereof maintaining engagement therewith, each protrusion formed with a stepped edge lying in a horizontal plane located above the bottom of said inertia ball when said inertia ball is resting thereon, each protrusion stepped edge engaging a limited portion of said surface of said inertia ball, said plurality of protrusions including a pair of protrusions spaced on either side of a vertical plane aligned with said direction of movement of said vehicle and passing through the center of said inertia ball, said pair of protrusions engaging said inertia ball on the forward side, said seating means further including a fixed surface aligned with the center of said inertia ball and engaging said inertia ball when said inertia ball is resting on said pair of protrusions on a side of said inertia ball opposite said forward side, thereby preventing free horizontal motion of said inertia ball from a position of rest of said inertia ball on said pair of protrusions.

2. A seating as claimed in claim 1, wherein in said position of rest of said inertia ball, said stepped edge of said each of said pair of protrusions hold the center of said inertia ball above said valve actuating pin and prevent said inertia ball from coming in contact with said bottom area, said valve actuating pin having a length sized such that in the position of rest of said inertia ball, said valve actuating pin is pressed by said inertia ball sufficiently so that said valve is thereby held open.

3. A seating as claimed in claim 1 wherein said pair of stepped protrusions each engage said forward side of said inertia ball at respective points below the center thereof and said fixed surface contacts said inertia ball so as to act approximately through the center of said inertia ball.

4. A seating as claimed in claim 3 wherein said seating means fixed surface consists of a vertical wall formed in said housing and defining in part said first chamber.

5. A seating as claimed in claim 1, wherein said inertia ball seating means comprises an odd numbered plurality of said stepped protrusions, including said pair of protrusions, said plurality of stepped protrusions disposed symmetrically around said hole to form a circle-shaped pattern, and wherein said fixed surface comprises one of said stepped protrusions aligned with said vertical plane and opposite said pair of protrusions.

6. A seating for an inertia ball of deceleration-sensitive brake power control for automotive vehicles, said brake power control including a housing having a firs chamber and a second chamber positioned beneath said first chamber, said inertia ball located in said first chamber, a bottom area forming a bottom of said first chamber, a hole being formed in said bottom area which provides a fluid connection of said first chamber to said second chamber, a valve actuating pin extending through said hole in said second chamber into said first chamber, a valve controlled by the position of said valve actuating pin in said hole, said valve actuating pin position controlled by said inertia ball, said valve able to close said fluid connection from said first chamber to said second chamber, and inertia ball seating means comprising a U-shaped step raised above said bottom area formed with a U-shaped stepped edge engaging a limited portion of one side of a perimeter of said inertia ball without any horizontal space therebetween thereby preventing free motion of said inertia ball in a position of rest of said inertia ball;

two circumferentially spaced protrusions engaging the perimeter of said inertia ball on a side opposite from said U-shaped step;

said U-shaped step having a partial circle-shaped edge partially extending about said hole, laterally symmetrical with respect to said two protrusions.

7. A seating as claimed in claim 6, wherein said seating means is constituted at least in part by an insert which is mounted in said housing, so as to create a third chamber in said housing disposed between said first chamber and said second chamber.

8. A seating as claimed in claim 7, wherein said insert is formed with holes which connect said first chamber to said third chamber.

9. A seating as claimed in claim 6 wherein said inertia ball is positively restrained on an opposite side from said U-shaped step by at least two posts at a distance from said valve actuating pin greater than the distance away of said U-shaped stepped edge restraining said inertia ball on the side opposite from said U-shaped step, said distance being lesser than the radius of said inertia ball, and said posts of height such that in the stable equilibrium condition the center of said inertia ball is situated exactly above said valve actuating pin, said posts being disposed specularly symmetrically with respect to said U-shaped step.

10. A seating for an inertia ball of deceleration-sensitive brake power control for automotive vehicles, said brake power control including a housing having a first chamber and a second chamber positioned beneath said first chamber, said inertia ball located in said first chamber, a bottom area forming a bottom of said first chamber, a hole being formed in said bottom area which provides a fluid connection of said first chamber to said second chamber, a valve actuating pin extending through said hole in said second chamber into said first chamber, a valve controlled by the position of said valve actuating pin in said hole, said valve actuating pin position controlled by said inertia ball, aid valve able to close said fluid connection from said first chamber to said second chamber, and inertia ball seating means comprising a pair of circumferentially spaced apart protrusions raised above said bottom area engaging a limited portion of the perimeter of one said of said inertia ball and a single fixed surface engaging the opposite side of said inertia ball without any horizontal space between either said pair of protrusions or said fixed surface and said inertia ball, thereby preventing free motion of said inertia ball in a position of rest of said inertia ball;

said pair of protrusions comprising a pair of pins mounted in said housing which point obliquely upward from said bottom area toward the center of said inertia ball and which have front faces which are tangentially abutted against the outer surface of said one side of said inertia ball.

* * * * *